United States Patent [19]

Reid

[11] Patent Number: 4,852,892

[45] Date of Patent: Aug. 1, 1989

[54] CONVENIENT DUAL FUEL TANK SYSTEM

[76] Inventor: Richard M. Reid, 25474 State St., Loma Linda, Calif. 92354

[21] Appl. No.: 638,377

[22] Filed: Aug. 7, 1984

[51] Int. Cl.$^4$ .............................................. B60R 27/00
[52] U.S. Cl. .................................... 280/834; 137/874; 141/248; 141/392
[58] Field of Search ............... 280/5 A; 137/255, 874; 141/105, 248, 392; 220/86 R

[56] References Cited

U.S. PATENT DOCUMENTS

| | | | |
|---|---|---|---|
| 1,244,143 | 10/1917 | Train | 137/255 |
| 2,518,574 | 8/1950 | Skopecek | 137/874 |
| 3,586,363 | 6/1971 | Omlid | 280/5 A |
| 3,884,255 | 5/1975 | Merkle | 280/5 A |
| 4,287,908 | 9/1981 | Storgard | 137/255 |

Primary Examiner—Charles A. Marmor
Attorney, Agent, or Firm—Poms, Smith, Lande & Rose

[57] ABSTRACT

A fuel system for vehicles having two gasoline or diesel fuel tanks includes a single filler port fitting having a Y-junction located close to the mouth of the filler, so that, when the user is at the gas pump, the spout of the fuel filling hose may be directed into either of the branch channels to fill either one tank or the other tank, selectively, or may be employed to fill both of the two fuel tanks. In addition, venting arrangements from each of the tanks are coupled to the filler port fitting to accommodate smog reduction requirements.

17 Claims, 3 Drawing Sheets

CONVENIENT DUAL FUEL TANK SYSTEM

FIELD OF THE INVENTION

This invention relates to fuel systems for vehicles having two gasoline or diesel fuel tanks.

BACKGROUND OF THE INVENTION

Many vehicles, particularly trucks, but also some automobiles, have two gas tanks. Thus, for example, many pickup truck options available from major automobile companies include the possibility of providing two gasoline tanks, one mounted on the left-hand side of the vehicle and the other mounted on the right-hand side of the vehicle. These tanks are normally provided with individual filler port fittings, one located on the left side of the vehicle for filling the left-hand tank, and the other filler port fitting located on the right-hand side of the car for filling the right-hand tank. In addition, the vehicles are usually provided with a solenoid valve switch which may be operated from the driver's seat, so that the driver may elect to use fuel from either one tank or the other.

The arrangements as described in the preceding paragraph have certain disadvantages. Thus, for example, if a heavily loaded truck with a trailer comes into a gas station, it must initially fill one tank with the gasoline pump being located on one side of the vehicle; and then the driver must maneuver the truck around so that the other side of the truck is adjacent to the gasoline pump to fill the second tank. Particularly when the truck is heavily loaded and has a large trailer attached to it, this operation may be difficult and timeconsuming.

It has also previously been proposed to have a single filler pipe for more than one gas tank, and a typical arrangement of that type is shown in U.S. Pat. No. 3,884,255, granted May 20, 1975, to Mr. Ralph H. Merkle. However, in this type of arrangement, there is only a single filler pipe, which directs gasoline to both tanks, using a Y-junction in the filler pipeline adjacent the two gasoline tanks, and with no arrangements being provided for selectively filling one gasoline tank or the other. Such a system may be satisfactory under optimum operating conditions, but can give rise to serious problems when any minor malfunction occurs. Thus, for example, if the solenoid valve switch fails to allow the tanks to be switched, or if one of the tanks develops a leak or becomes disabled or fouled for some reason, the user is not able to supply gasoline to a selected one of the two tanks which he might wish to use.

Accordingly, a pricipal object of the present invention, is to overcome the problems of prior dual fuel tank arrangements, and permit the filling of either or both gas tanks concurrently from only one side of the vehicle.

SUMMARY OF THE INVENTION

In accordance with the present invention, a vehicle with two fuel tanks is provided with a single filler port fitting including a Y-junction located close to the mouth of the filler port fitting and having two branch fuel conduits oriented so that either of the two branch conduits may receive the spout of a fuel filling hose, so that either of the two tanks may be selectively filled from the single filler port fitting. Hoses are individually connected from the branch fuel conduits to each of the two gas tanks.

Collateral features of the invention include the provision of a venting opening on the filler port fitting, and providing vent connections from both of the two gas tanks to this vent fitting so that, as a tank is filled, the vapors may be caught, in accordance with known smog prevention techniques. In addition, the normal rubber hose fittings extending from commercially available dual gas tank systems may be employed to connect to the single filler port fitting or to pipes which are coupled to the single filler port fitting from the far side of the vehicle. Either metal conduits or flexible hoses may be employed as conduits to interconnect the gas tank located on the far side of the vehicle with the single filler port fitting using a relatively large diameter conduit for the gasoline, and a small diameter conduit for the gasoline fumes.

Advantages of the system include the capability of filling either or both tanks from one side of the vehicle. Then, if a solenoid valve switch fails to allow the tanks to be switched, the vehicle owner can choose to fill the tank which is functioning properly. Similarly, if a tank or tank fuel line should develop a leak, then the vehicle owner can choose to fill the tank which is not malfunctioning, and thus realize one of the collateral benefits of having two gasoline tanks.

Other objects, features, and advantages of the invention will become apparent from a consideration of the following detailed description and from the accompanying drawings.

DETAILED DESCRIPTION

Figure 1:
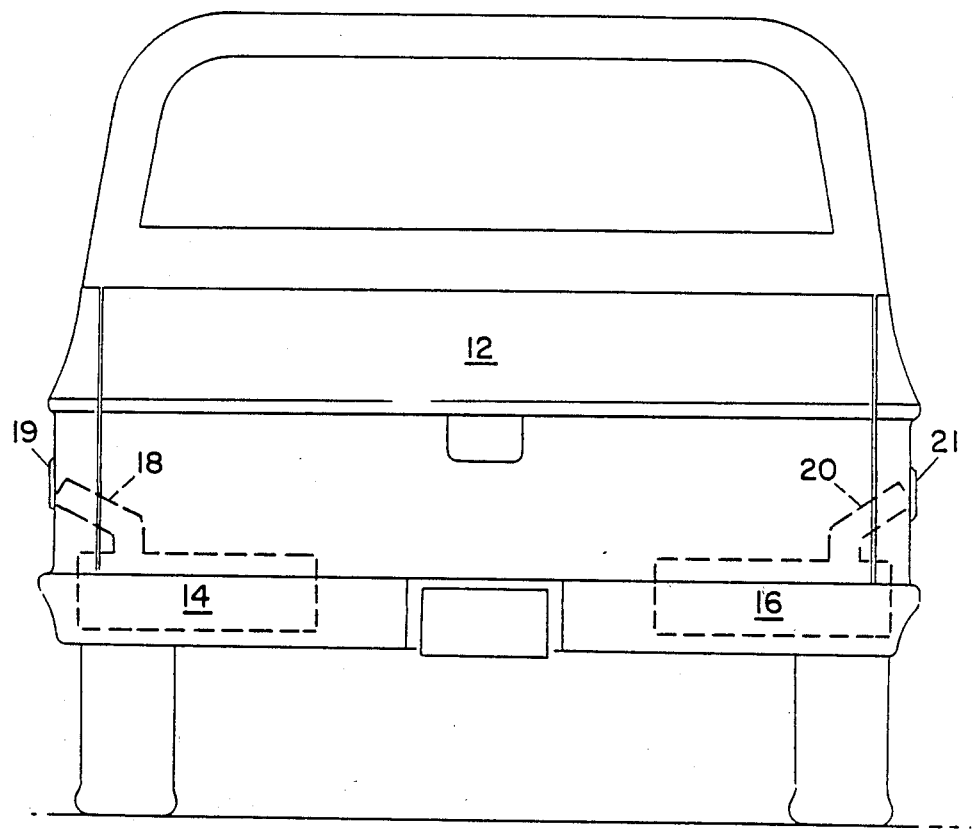
FIG. 1 is a rear view of a pickup truck having two gas tanks and separate filler ports, in accordance with the prior art.

Referring more particularly to the drawings, FIG. 1 is a schematic showing of a pickup truck 12 provided with individual gas tanks 14 and 16. The two gas tanks 14 and 16 have individual filler port fittings 18 and 20. The filler port fitting 18 may be accessed from the left-hand side of the vehicle, through pivoted door or access port 19, to fill the gasoline tank 14; while the filler port fitting 20 is accessed from the right-hand side of the vehicle through door or access port 21, to fill the gas tank 16. This type of arrangement has been used in many vehicles, and has been available as an option on most General Motors pickup trucks which hav been sold for the past decade or so.

As mentioned above, if the pickup truck 12 of FIG. 1 was heavily loaded, and also had a trailer attached to it, it would be virtually impossible to fill both of the two gas tanks 14 and 16 with a single trip to one side of the pumps in a gas station. Instead, first one of the tanks would have to be filled, with the vehicle on one side of a gasoline pump, and then the vehicle and attached trailer would have to be jockeyed around so that the other side of the vehicle could be adjacent the pump and the other gas tank filled. Of course, this may be quite exasperating, and difficult, particularly when the gas station is crowded with other traffic.

The remaining FIGS. 2 through 7 of the drawings are different views of a system illustrating the principles of the present invention in which a single filler port fitting 24, located on one side of the vehicle, is employed to selectively fill either or both of the gas tanks 14 and 16. Each gas tank is normally provided with a rubber hose 26, 28 secured to a fitting on the top of the gas tank by conventional clamps 30 and 32.

Figure 2:
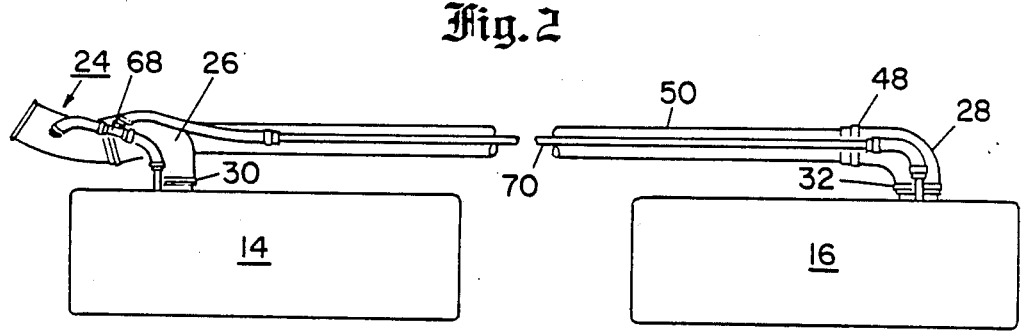
FIG. 2 is a rear view of a dual gas tank system illustrating the principles of the present invention, and in which a single filler port fitting is employed.
Figure 3:
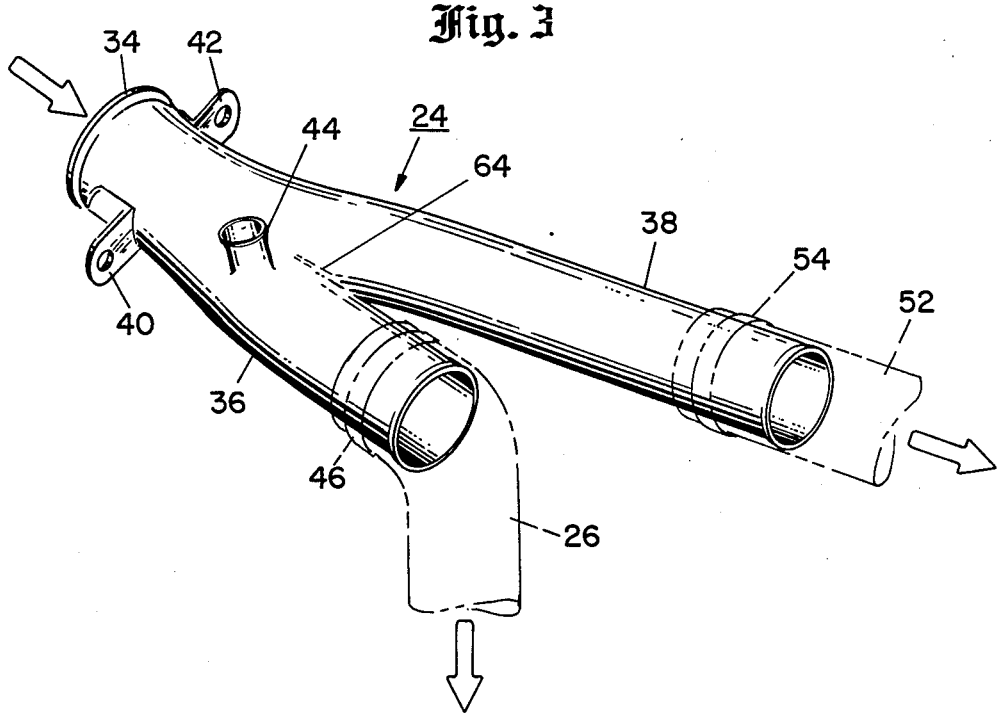
FIG. 3 is an isometric view of the single filler port fitting showing the connections to the two gas tank conduits.
Figure 4:
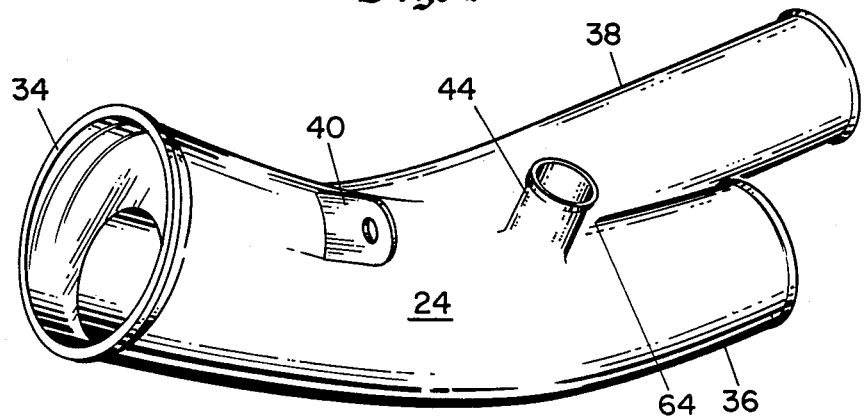
FIG. 4 is another view of the conduit of FIG. 3, showing the mouth of the fitting.
Figure 5:
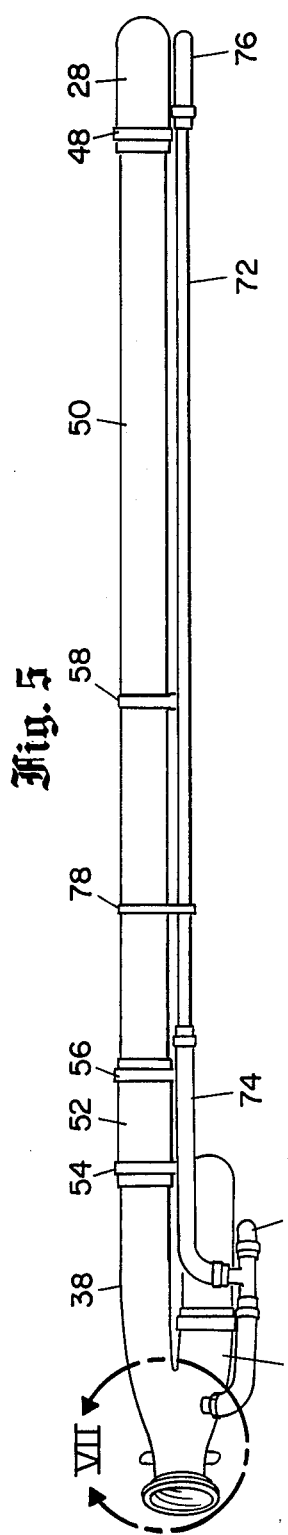
FIG. 5 is a top view of the branching filler port fitting and the gasoline and gasoline vapor conduits employed in the system of FIG. 2.
Figure 6:
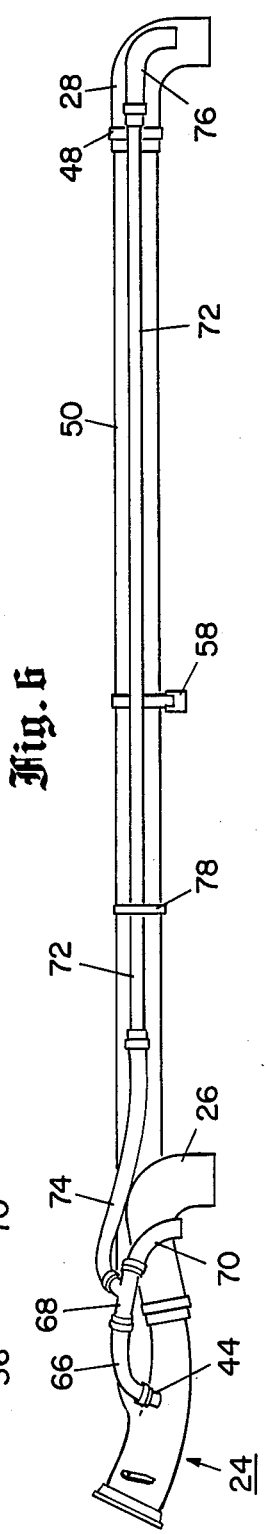
FIG. 6 is a side view of the filler port fitting and the conduits as shown in FIG. 5.

The configuration of the branching fitting 24 per se is best shown in FIGS. 3 and 4. The fitting 24 includes the single threaded input mouth 34, and the two branch channels 36 and 38. In addition, the fitting 24 is provided with mounting brackets 40 and 42, as well as the small diameter fitting 44 on the top of unit 24 for receiving gasoline fumes from the two gas tanks. The rubber hose 26 is connected directly to the branch conduit 36 of the fitting 24, without any significant change from its original configuration as installed by the automobile manufacturer. Thus, the clamp 30 (see FIG. 2) need not even be removed, and the second clamp 46 for the other end of the hose 26 need only be loosened from its original fitting and tightened onto the branch 36 of fitting 24. With regard to the gasoline tank 16, the metal clamp 32 must be loosened, and the rubber hose 28 turned 180 degrees to face the other side of the vehicle, as shown in FIG. 2. It is then secured by its original clamp 48 to a metal pipe 50 which extends transversely across the greater part of the width of the vehicle. A short rubber hose 52 and a pair of clamps 54 and 56 (see FIG. 5) serve to connect the gas tank 16 to the other branch 38 of the fitting 24. Bracket 58 may be employed to mount the metal conduit 50 onto the frame of the vehicle.

Figure 7:
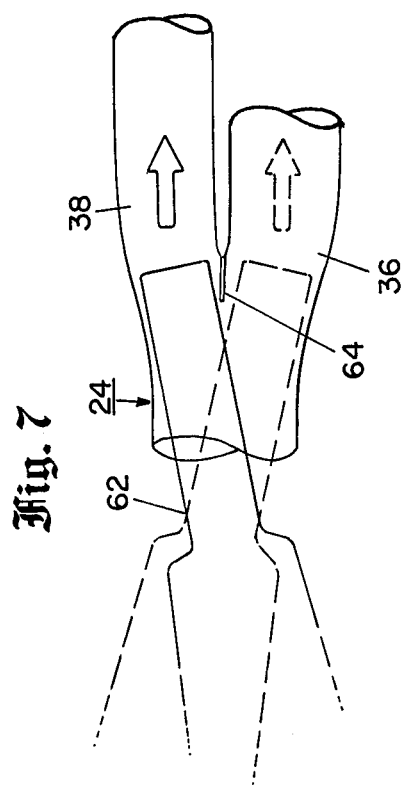
FIG. 7 illustrates the selective filling of either one gasoline tank or the other, depending on the orientation of the spout of the gasoline filler hose.

FIG. 7 illustrates the filling of either or both of the two gas tanks by the orientation of the spout 62 of the fuel filling hose. By locating the branching point 64 of the fitting 24 close to the mouth 34 of the filler port fitting 24, the spout 62 may be selectively directed into either the branch conduit 36 or the branch conduit 38 to fill either tank as may be desired, from one side of the vehicle.

Concerning the gasoline vapor conduits, a rubber tube 66 of relatively small diameter interconnects the fitting 44 on the filler port fitting 24 to the T-junction 68 which is made of metal. The short rubber hose 70 connects the T-junction 68 to the vent at the top of the gas tank 14. A relatively small diameter metal conduit 72, connected to the T-junction 68, by the rubber tube 74, extends parallel to the large diameter metal tube 50 to the right-hand side of the vehicle. The small diameter rubber tube 76 connects the conduit 72 to the gasoline vapor vent from the right-hand gas tank 16, to complete the vapor control path to the fitting 44. A plastic band 78 may be employed to secure the metal tube 72 to the larger diameter metal tube 50. Conventional metal clamps of the type normally used for automobile water and gasoline lines, and which may be tightened up by a screwdriver, may used throughout, to secure the rubber hoses to the pipes 50 and 70, and to the fittings on the gasoline tanks and on the filler port fitting 24.

In closing, it is to be understood that the specific embodiment shown in the drawings and described in detail hereinabove is merely illustrative of the principles of the present invention. Various changes in the implementation of the invention may be made by those skilled in the art. Thus, by way of example, and not of limitation, instead of using metal conduits 50 and 70, appropriate rubber or plastic hoses which are resistent to fuel and fuel vapors, could be employed to extend from the fitting 24 to the gas tanks. In addition, the fitting 24 could be made of appropriate plastic material resistant to gasoline and gasoline fumes, instead of being made of metal. Accordingly, it is to be understood that the present invention is not limited to that precisely as shown in the drawings and described in detail hereinabove.

What is claimed is:

1. A convenient dual fuel tank system for gasoline or diesel powered vehicles comprising:
   first and second fuel tanks, said two fuel tanks being mounted on opposite sides of a vehicle;
   a single fuel filler port fitting having an input mouth and including a Y-junction located close to the mouth of the filler port fitting having two branch fuel conduits, and including means for receiving the spout of a fuel filling hose to selectively direct fuel into either of said two branch fuel conduits;
   means for connecting one of said branch conduits to fill said first fuel tank; and
   means for connecting the other of said branch conduits to fill said second fuel tank;
   whereby either or both of said fuel tanks may be filled with a single vehicle fuel stop through a single fuel input port fitting.

2. A convenient dual fuel tank system as defined in claim 1 further comprising a vent connection on the top of said filler port fitting, and vent conduit means for connecting from the top of each fuel tank to said vent connection.

3. A convenient dual fuel tank system as defined in claim 1 wherein one of said connecting means includes a metal conduit extending a substantial distance from the side of the vehicle where said filler port fitting is located to the remote fuel tank located on the opposite side of the vehicle.

4. A convenient dual fuel tank system as defined in claim 3 including an additional metal conduit means extending generally parallel to said metal conduit for conducting fuel vapors from said remote fuel tank to said fuel filler port fitting.

5. A convenient dual fuel tank system as defined in claim 4 including rubber connecting hoses for interconpegting said conduit and said conduit means with said first and second fuel tanks and said filler port fitting.

6. A convenient dual fuel tank system as defined in claim 2 wherein said vent conduit means includes a metal T-fitting, a small diameter metal conduit extending between said fuel tanks, and rubber hose means for interconnecting said fuel tanks, said T-fitting, said metal conduit and said filler port fitting.

7. A convenient dual fuel tank system for gasoline or diesel powered vehicles including first and second fuel tanks, comprising:
   a single fuel filler port fitting having an input mouth and including a Y-junction located close to the mouth of the filler port fitting having two branch fuel conduits, and including means for receiving the spout of a fuel filling hose to selectively direct fuel into either of said two branch fuel conduits;

means for connecting one of said branch conduits to fill said first fuel tank; and means for connecting the other of said branch conduits to fill said second fuel tank;

whereby either or both of said fuel tanks may be filled with a single vehicle fuel stop through a single fuel input port fitting.

8. A convenient dual fuel tank system as defined in claim 7 further comprising a vent connection on the top of said filler port fitting, and vent conduit means for connecting from the top of each fuel tank to said vent connection.

9. A convenient dual fuel tank system as defined in claim 7 wherein said fuel tanks are mounted on opposite sides of a vehicle, and wherein one of said connecting means includes a metal conduit extending a substantial distance from the side of the vehicle where said filler port fitting is located to the remote fuel tank located on the opposite side of the vehicle.

10. A convenient dual fuel tank system as defined in claim 9 including an additional metal conduit means extending generally parallel to said metal conduit for conducting fuel vapors from said remote fuel tank to said filler port fitting.

11. A convenient dual fuel tank system as defined in claim 10 including rubber connecting hoses for interconnecting said conduit and said conduit means with said first and second fuel tanks and said filler port fitting.

12. A convenient dual fuel tank system as defined in claim 8 wherein said vent conduit means includes a metal T-fitting, a small diameter metal conduit extending between said fuel tanks, and rubber hose means for interconnecting said fuel tanks, said T-fitting, said metal conduit and said filler port fitting.

13. A convenient dual fuel tank system for gasoline or diesel powered vehicles comprising:

first and second fuel tanks;

a single fuel filler port;

first and second branch fuel conduit means opening to said single filler port;

said filler port and branch conduit means including means for receiving the spout of a fuel filling hose to selectively direct fuel into either of said two branch fuel conduit means;

means for connecting one of said branch conduit means to fill said first fuel tanks; and means for connecting the other of said branch conduit means to fill said second fuel tank;

whereby either or both of said fuel tanks may be filled with a single vehicle fuel stop through a single fuel input port.

14. A convenient dual fuel tank system as defined in claim 13 further comprising a fuel vapor vent connection associated with said filler port, and vent conduit means for connecting from the top of each fuel tank to said vent connection.

15. A convenient dual fuel tank system as defined in claim 13 wherein said fuel tanks are mounted on opposite sides of a vehicle, and wherein one of said connecting means includes a metal conduit extending a substantial distance from the side of the vehicle where said filler port is located to the remote fuel tank located on the opposite side of the vehicle.

16. A convenient dual fuel tank system as defined in claim 15 including an additional metal conduit means extending generally parallel to said metal conduit for conducting fuel vapors from said remote fuel tank to said fuel vapor vent connection.

17. A convenient dual fuel tank system as defined in claim 14 wherein said vent conduit means includes a metal T-fitting, a small diameter metal conduit extending between said fuel tanks, and rubber hose means for interconnecting said fuel tanks, said T-fitting, said metal conduit and said fuel vapor vent connection.

* * * * *